Patented Oct. 28, 1924.

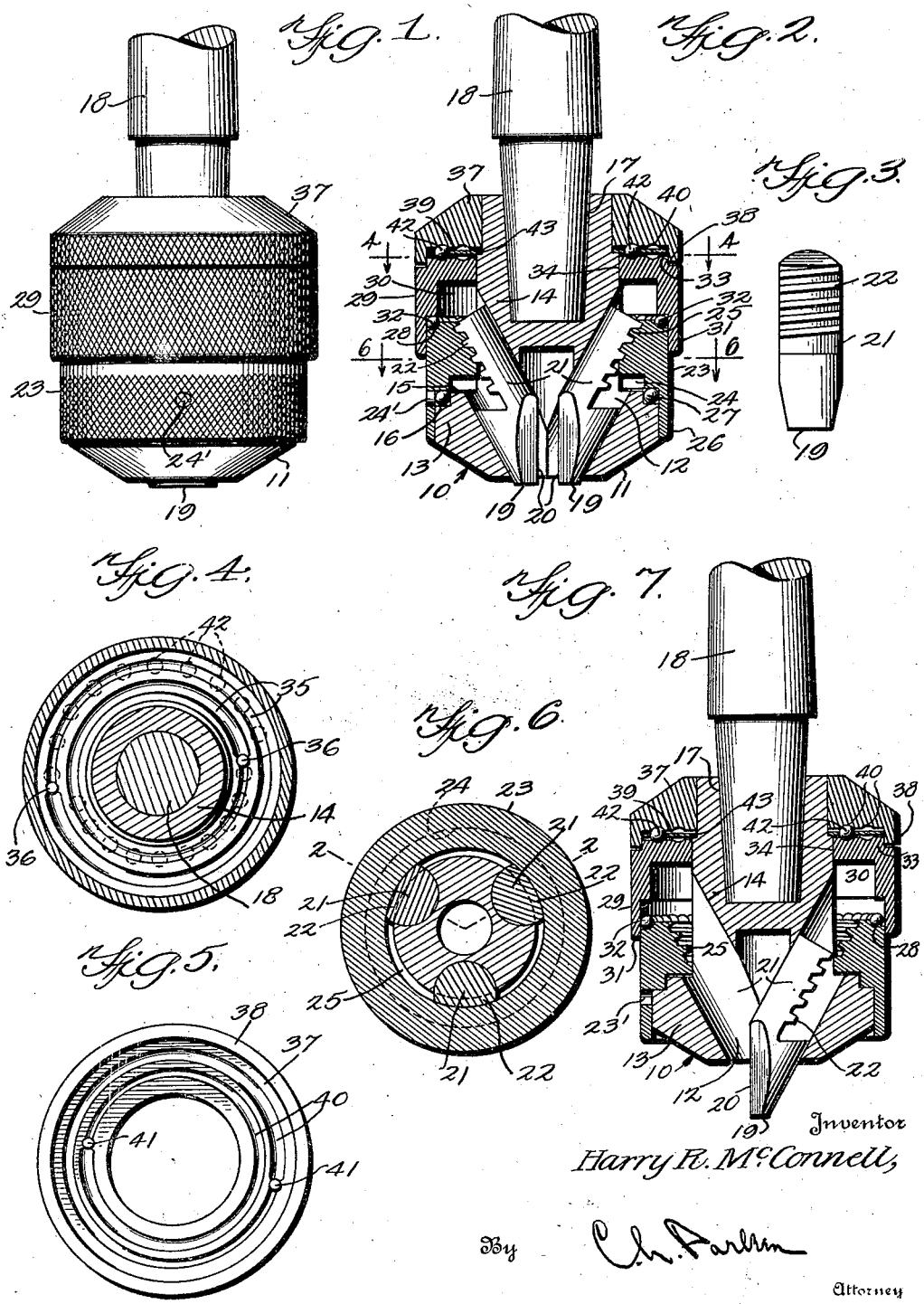

1,513,332

UNITED STATES PATENT OFFICE.

HARRY R. McCONNELL, OF RICHMOND, VIRGINIA, ASSIGNOR TO THE McCONNELL-BROWNING ENGINEERING COMPANY, OF RICHMOND, VIRGINIA, A CORPORATION OF VIRGINIA.

CHUCK.

Application filed April 4, 1923. Serial No. 629,907.

*To all whom it may concern:*

Be it known that I, HARRY R. McCONNELL, a citizen of the United States, residing in the city of Richmond and State of Virginia, have invented certain new and useful Improvements in Chucks, of which the following is a specification.

This invention relates to chucks and more particularly to such a device employing a plurality of gripping jaws adapted to be clamped about the shank of the tool, the body portion of the device being provided with actuating means whereby the gripping elements may be easily and rapidly moved into loose engagement with the tool, supplementary means being provided for tightly clamping the tool without the use of a wrench or similar tool.

In a copending application, Serial No. 617,592, filed February 7, 1923, I have shown and described a chuck embodying the features above outlined. The chuck shown in my copending application employs a plurality of downwardly converging jaws provided upon their outer faces with thread sections adapted to be engaged by the internal threads of a rotatable ring whereby the jaws may be moved into and out of engagement with the shank of the tool. With the construction mentioned and in the constructions now commonly in use in connection with chucks of this character, the rotatable internally threaded ring must be split to permit assembly of the device and the split sections are secured within a rotatable sleeve with which they have a driving fit. Rough usage is apt to loosen the split ring from its sleeve and under some conditions the gripping jaws are lost from the chuck.

It is an important object of the present invention to provide a chuck of the general character shown in the copending application above referred to, the construction being such as to permit the use of a one piece internally threaded ring, the assembly of the device being permitted in a novel manner whereby a particularly durable construction is obtained and possibility of the loss of parts eliminated.

A further object of the invention is the provision of a chuck of limited length which will be particularly adaptable for use in connection with electric drills.

Other objects and advantages of the invention will be apparent during the course of the following description.

In the accompanying drawings I have shown one embodiment of the invention. In this showing, Figure 1 is a side elevation of a chuck embodying the invention, Figure 2 is a central longitudinal sectional view taken substantially on the line 2—2 of Figure 6, Figure 3 is a detail view of one of the jaw members, Figure 4 is a section taken on line 4—4 of Figure 2, Figure 5 is a bottom plan view of the cap, Figure 6 is a section taken on line 6—6 of Figure 2, and, Figure 7 is a view similar to Figure 2 illustrating the manner of assembling the jaw members.

Referring to the drawings, the numeral 10 designates the body portion of the chuck as a whole having a tapered lower end 11. The body portion 10 is provided with a plurality of circularly arranged downwardly converging openings 12, as shown in Figures 2 and 7. The lower end of the body portion is circular in cross section and relatively large as shown at 13 while the upper end is of elongated cylindrical shape as shown at 14. The upper section 14 of the body portion is substantially smaller in diameter than the section 13 providing an annular shoulder 15. The shoulder 15 is provided with an annular groove 16 for a purpose to be described. The upper end of the body portion 10 is provided with an axial opening 17 adapted to receive the lower end of the rotatable spindle 18 of a drill press or other machine.

A plurality of jaw members 19 are mounted in the openings 12 of the body portion. The jaw members 19 are generally circular in cross section and are provided with gripping edges 20 arranged substantially parallel to the axis of the spindle 18 in the usual manner. The upper ends of the gripping elements 19 are reduced as at 21 and provided with relatively high pitch teeth 22.

A rotatable sleeve 23 surrounds the body portion above the shoulder 15 thereof and is provided in its lower face with an annular depression 24 of slightly greater diameter than that of the shoulder 15, as shown. The sleeve 23 is provided with internal threads 25 adapted to engage the threads 22 of the jaw members. The lower end of the sleeve 23 is provided with a depending annular lip 26 which surrounds the lower section 13 of the body portion. The depending lip 26 together with the lower end of the sleeve 23 and the annular groove 16 of the body portion form a ball race in which is mounted a plurality of anti-friction balls 27. The lip 26 is provided with an opening 23' communicating with the ball race receiving the balls 27, and this opening is normally closed by a plug 24' driven therein. The upper and outer portion of the sleeve 23 is provided with an annular groove 28 for a purpose to be described.

A second rotatable sleeve 29 surrounds a portion of the body portion as shown in Figures 2 and 7. The sleeve 29 is provided interiorly with an annular depression 30 adapted to receive the upper ends of the jaw members 19 when the latter are moved to their upper position. The sleeve 29 is further provided with a depending annular lip 31 surrounding the upper end of the sleeve 23. The lip 31 together with the groove 28 and the lower end of the sleeve 29 form an annular ball race for the reception of anti-friction balls 32. The length of the sleeve 23 is preferably such as to permit limited vertical movement between the sets of ball bearings 27 and 32 as will be understood. The upper end of the sleeve 29 is provided with a reduced extension 33 while the sleeve is provided with an axial opening 34 surrounding the upper end 14 of the body portion and adapted to be rotated thereabout. The upper face of the sleeve 29 is provided with inner and outer substantially circular cam grooves 35. These grooves are provided at substantially opposite points with stop pins 36. Each groove 35 increases very gradually in depth around the upper face 29, the high and low points of each groove being arranged adjacent the stop pins 36, as shown.

A cap 37 surrounds the upper end 14 of the body portion above the sleeve 29. This cap may be pressed upon the body portion to secure it in position or may be secured thereto in any other suitable manner. The cap 37 is provided with a peripheral depending lip 38 which surrounds the reduced extension 33 of the sleeve 29. The lower face 39 of the cap 37 is arranged substantially parallel to and spaced from the upper end of the sleeve 29. The face 39 of the cap 37 is provided with a pair of circular grooves 40 corresponding in arrangement to the grooves 35. Stop pins 41, similar to the pins 36 are arranged between the high and low points of the grooves 40. It will be apparent that when the cap, as shown in Figure 5, is placed in position above the sleeve 29, the grooves 40 will increase in depth in a direction opposite to the grooves 35. A plurality of ball bearings 42 are mounted in each groove 35 and extend into the grooves 40 as shown in Figures 2 and 7. As shown in Figure 4 the balls 42 in each groove extend throughout substantially one-half the lengths of the grooves, the sets of balls in the inner and outer grooves 35 being oppositely arranged and preferably equal in number as shown. A spacer plate 43 is mounted between the adjacent faces of the cap 37 and sleeve 29 to maintain the balls 42 in proper spaced relation.

In assembling the device, the sleeve 23 is introduced over the upper end of the body portion and permitted to drop to the position shown in Figure 7, with the lower end of the sleeve resting upon the bottom of the groove 16, the shoulder 15 being received within the depression 24. The ball bearings 32 are then placed in position and the sleeve 29 mounted as shown in Figures 2 and 7. The spacer plate 42 is then slipped over the upper end of the body portion and the openings therein filled with the ball bearings 42, whereupon the cap 37 may be driven over the upper end of the body portion. As shown in Figure 7, the jaw members 19 are inclined outwardly at their upper ends to a considerable degree and the depths of the threads of the jaw members and sleeve 23 are such that when the sleeve is in the position shown in Figure 7 the threads of the sleeve will be moved downwardly sufficiently to clear the outer limits of the threads 22. Thus it will be seen that the jaw members may be inserted into the lower end of the body portion as shown in Figure 7. The jaw members are, of course, inserted singly and each is moved to its uppermost position upon insertion to make room for the next succeeding jaw member within the lower end of the body portion. When all the jaw members have been inserted, the sleeve 23 is moved to its upper position opening the annular space forming the ball race for the bearings 27. These bearings are then introduced through the opening 23', the ball race preferably being entirely filled with the bearings. The plug 24' is then driven in position and the outer faces of the sleeves 23 and 29 as well as the outer face of the cap 37 may be knurled as shown in Figure 1. When the outer face of the sleeve 23 is knurled the plug 24' cannot be detected, and the process of knurling tends to upset the metal of the plug 24' to hold it securely within the opening 23' to prevent danger of loss of the plug when the chuck is in operation. The extreme angularity of the jaws 19 permits the chuck as a whole to be made considerably shorter than the chucks now commonly employed.

The operation of the device is as follows: The sleeve 29 is rotated until the balls 42 are arranged within the deeper portions of the grooves 35 and 40. The sleeve 29 is then steadied by the hand of the operator and the sleeve 23 is rotated to move the jaw members 19 to their upper and outer positions. The shank of the drill or other tool is then inserted between the gripping edges 20 of the jaws and the sleeve 23 rotated in the opposite direction until the edges 20 engage the shank of the tool. The sleeve 29 is then rotated to move the balls 42 toward the shallower portions of the grooves 35 and 40 and this action of course forces the sleeve 29 downwardly with respect to the cap 37. This action in turn is communicated to the sleeve 23 and the jaw members 19 forcing them downwardly into tight gripping engagement with the tool. Any tendency of the jaw members to become loosened due to their extreme angularity is completely overcome by the tight gripping action obtained through the leverage of the sleeve 29, this leverage being due to the gradual increases in the depths of the grooves 35 and 40.

From the foregoing it will be seen that I provide a chuck wherein an extremely tight gripping action is obtained and the device is capable of continuous use without danger of loss of parts. The various ball races are protected from outside interference and since the balls 27 limit the downward movement of the sleeve 23, the jaw members 19 cannot become lost during the operation of the chuck.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A chuck comprising a body portion, a plurality of jaw members carried by said body portion and adapted to be gripped about a tool, a rotatable sleeve surrounding said body portion and engaging said jaw members to move them into engagement with the tool, said body portion within said sleeve being provided with an annular groove, said sleeve being provided with a groove coacting with said first named groove to form a concealed ball race, and ball bearings arranged in said ball race, said sleeve being adapted to move longitudinally to release said jaw members from said sleeve when said ball bearings are not in position.

2. A chuck comprising a body portion provided with a plurality of downwardly converging openings, jaw members slidably mounted in said openings and movable downwardly and inwardly to grip a tool, said jaw members being provided with converging threaded portions, a rotatable member surrounding said body portion and provided internally with threads corresponding in inclination to the threads of said jaw members, said rotatable member being longitudinally movable in one direction to engage the threads thereof with the threads of said jaw members and oppositely movable to release said engagement, and bearing members adapted to be arranged between said rotatable member and said body portion to maintain threaded engagement between said rotatable member and said jaw members.

3. A chuck comprising a body portion, a plurality of jaw members carried by said body portion and adapted to be gripped about a tool, a rotatable member surrounding said body portion and normally engaging said jaw members to move them into engagement with the tool, said rotatable member being movable in one direction to release it from engagement with said jaw members, said rotatable member and said body portion having portions cooperating to form a ball race, and ball bearings arranged in said ball race and adapted to maintain said rotatable member in engagement with said jaw members.

4. A chuck comprising a body portion having a reduced cylindrical upper end and provided with a plurality of downwardly converging openings, jaw members slidably mounted in said openings and provided with downwardly converging threaded portions, a cap rigidly secured to the reduced end of said body portion adjacent its upper end, a pair of independently rotatable sleeves surrounding the reduced end of said body portion below said cap, the lower of said sleeves being internally threaded to engage the threads of said jaw members and movable downwardly to release said engagement, ball bearings mounted between the lower end of said sleeve and said body portion to maintain the sleeve in its upper and engaging position, the adjacent faces of said sleeves having rotatable engagement with each other, the adjacent faces of said cap and the upper of said sleeve being provided with circular grooves of oppositely increasing depths, and ball bearings arranged in said grooves, said lower sleeve being capable of limited longitudinal movement when said bearings are in the deeper portions of said grooves.

5. A chuck comprising a body portion, a plurality of jaw members carried by said body portion and adapted to be gripped about a tool, a rotatable sleeve surrounding said body portion and normally engaging said jaw members to move them into engagement with the tool, said sleeve being movable longitudinally in one direction to permit insertion of said jaw members in said body portion, said body portion and said sleeve cooperating to form a concealed ball race, and ball bearings arranged in said ball race, said ball bearings being adapted to prevent longitudinal movement of said sleeve, said sleeve being provided with a normally closed opening through which said ball bearings are adapted to be inserted after the jaw members are in position.

6. A chuck comprising a body portion, a plurality of jaw members carried by said body portion and adapted to be gripped about a tool, a rotatable member surrounding said body portion and normally having positive actuating engagement with said jaw members to move them into engagement with the tool, said rotatable member being longitudinally movable in one drection to positively release it from engagement with said jaw members, and means adapted to be positioned between said body portion and said rotatable member to maintain the latter in positive engagement with said jaw members.

7. A chuck comprising a body portion, a plurality of jaw members carried by said body portion and adapted to be gripped about a tool, an actuating member having engagement with said jaw members and rotatable to move them into engagement with a tool, said actuating member and said jaw members being relatively movable longitudinally to release engagement therebetween to permit removal of said jaw members, and means for preventing relative movement of said jaw members and said actuating member.

In testimony whereof I affix my signature in presence of two witnesses.

HARRY R. McCONNELL.

Witnesses:
CHAS. O. BURCH,
GEO. J. HOOPER.